United States Patent
Davis et al.

[11] 3,897,985
[45] Aug. 5, 1975

[54] ALIGNING MEANS FOR BEARINGS

[75] Inventors: Lawrence P. Davis; James E. Crutcher, both of Phoenix, Ariz.

[73] Assignee: Sperry Rand Corporation, New York, N.Y.

[22] Filed: Dec. 4, 1972

[21] Appl. No.: 312,241

[52] U.S. Cl. ............... 308/176; 308/178; 308/184; 308/189
[51] Int. Cl. ............................................ F16c 19/10
[58] Field of Search .......... 308/184 R, 26, 176, 184, 308/178, 189

[56] References Cited
UNITED STATES PATENTS

| | | | |
|---|---|---|---|
| 2,114,670 | 4/1938 | Searles | 308/26 |
| 2,188,862 | 1/1940 | Horge | 308/184 R |
| 3,015,932 | 1/1962 | McCard | 308/184 R |
| 3,101,979 | 8/1963 | Mard | 308/26 |
| 3,237,471 | 3/1966 | Wunsch | 308/1 R |
| 3,490,251 | 1/1970 | Roethlisberger | 308/178 |
| 3,505,881 | 4/1970 | Varner | 308/178 |
| 3,614,179 | 10/1971 | Hosken | 308/6 R |

FOREIGN PATENTS OR APPLICATIONS

| | | | |
|---|---|---|---|
| 544,555 | 8/1957 | Canada | 308/184 |
| 625,064 | 9/1961 | Italy | 308/26 |
| 658,373 | 10/1951 | United Kingdom | 308/184 |
| 1,305,706 | 4/1962 | France | 308/26 |

Primary Examiner—Charles J. Myhre
Assistant Examiner—R. H. Lazarus
Attorney, Agent, or Firm—Howard P. Terry; Thomas J. Scott

[57] ABSTRACT

A cartridge type ball bearing arrangement for rotatably supporting a shaft or journal within a housing is disclosed. The cartridge is fitted within a clearance bore in the housing and is subject to translational motions along its rotational axis with respect to the surface of the clearance hole to compensate for thermal and pressure gradient expansion and contractions of the shaft over a temperature range and for machining tolerance limitations. O-rings located in grooves in the surface of the clearance hole or in the surface of the cartridge provide a zero-clearance fit between the cartridge outer wall and the supporting surface of the clearance hole under normal radial loads thereby maintaining the spin vector of the rotating shaft in precise alignment while accommodating differential axial motion of the shaft with respect to the housing.

9 Claims, 4 Drawing Figures

ALIGNING MEANS FOR BEARINGS

BACKGROUND OF THE INVENTION

1. Field of the Invention

The subject invention pertains to the art of bearings and particularly to bearings which includes a bearing cartridge supporting an inner rotating member wherein the spin vector of the rotating member must be maintained in precise radial alignment and yet the cartridge be relatively axially free in a variable temperature and pressure environment and also free of binding and galling in a high vibration environment.

2. Description of the Prior Art

In a gyroscopic apparatus, the bearings supporting the gyroscopic rotor must be critically loaded and such loading maintained substantially constant over wide variations in ambient operating temperature and pressure. One way of accomplishing this is to mount each end of the rotor support journal in a bearing pair preloaded by means of an outer bearing sleeve, hereinafter referred to as a bearing cartridge. The bearing cartridge at one end of the rotor shaft is axially fixed while the bearing cartridge on the opposite end of the rotor shaft is free to translate axially under temperature variations. Since the bearing cartridge and housing support bore are also subjected to temperature variations, a certain clearance must be tolerated so that the bearing cartridge may always be free to translate. Such required clearance results in objectionable problems such as misalignment of the gyro momentum vector, radial displacement of the bearing cartridge within the bore resulting in objectionable noise, possible galling and subsequent freezing of the mating surfaces due to axial vibration (especially experienced by space vehicle stabilizing Control Moment Gyroscopes and/or Reaction Wheels during launch).

However, regardless of the tolerance control exercised during the manufacturing process, it is practically impossible to eliminate all play of the shaft or bearing cartridge with respect to the cylindrical surface of the housing clearance bore particularly during operation at temperature extremes. Also, in a vibratory environment, the shaft tends to wobble within the clearance hole thereby producing audible noise during operation by vibration of the cartridge against the sides of the clearance hole. However, a more serious problem arises due to axial vibrations and that is the probability of galling between the two interfacing materials of the bearing cartridge and the housing resulting in a freezing of the mating surfaces and preventing the required axial freedom. Furthermore, during normal operation, any slop or play will affect the accuracy of the gyroscopic system requiring precise alignment between the gyro spin vector and the supporting housing.

In gyroscopic applications and particularly in gyroscopic stabilization systems, such as momentum control systems, it is most essential that the H (angular momentum) vector be maintained precisely aligned relative to a vehicle axis. If this vector has any compliance between the spin axis and its support, such compliance will result in a non-linearity which will adversely affect the gyroscopic dynamics. For example, if such compliance is too soft, a high gain control loop will be impossible to achieve.

The present invention overcomes or obviates the foregoing problems by relaxing the requirement for tight tolerance control in boring the clearance hole in the housing, eliminating in some instances the need for plating the mating surfaces, providing a means for reducing the audible noise and shock experienced in a vibratory environment and most importantly, however, accurately maintaining the spin vector alignment of the rotating member relative to the housing.

SUMMARY OF THE INVENTION

The present invention employs at least one O-ring entrapped in a perimetrical groove formed in the surface of a clearance bore of the housing or in the outer surface of a bearing support member or bearing cartridge disposed in the clearance bore of the housing. In most applications, however, a plurality of O-rings confined by axially spaced perimetrical grooves will be required to provide the desired operating characteristics.

These grooves may be formed near each end of the clearance hole in the housing and their depth is controlled to maintain the desired interference of the flexible O-rings and the mating shaft support member. The radial position of the longitudinal axis of the shaft with respect to the surface of the housing clearance bore may be predetermined by controlling the concentricity or eccentricity of the compressed O-rings when the shaft bearing cartridge is slid into the clearance hole.

In gyroscopic applications, it may be desirable to radially preload the bearing cartridge by positioning the shaft axis slightly off-center with respect to the longitudinal axis of the clearance bore hole so that one side of the bearing cartridge rests snugly against the bore walls while the opposite side is resiliently retained by O-ring compression. This effect is obtained in a modification of the present invention by eccentrically locating the O-rings relative to the bore. The inherent flexibility of the O-rings enables the bearing to be thus radially preloaded, reducing the audible noise during operation, improving the stability and alignment of the rotating member spin vector during normal operation, and reducing the shock while substantially reducing galling effects between the surfaces of the shaft bearing support and housing bore due to vibratory environments.

DESCRIPTION OF THE PREFERRED EMBODIMENT

Figure 1:
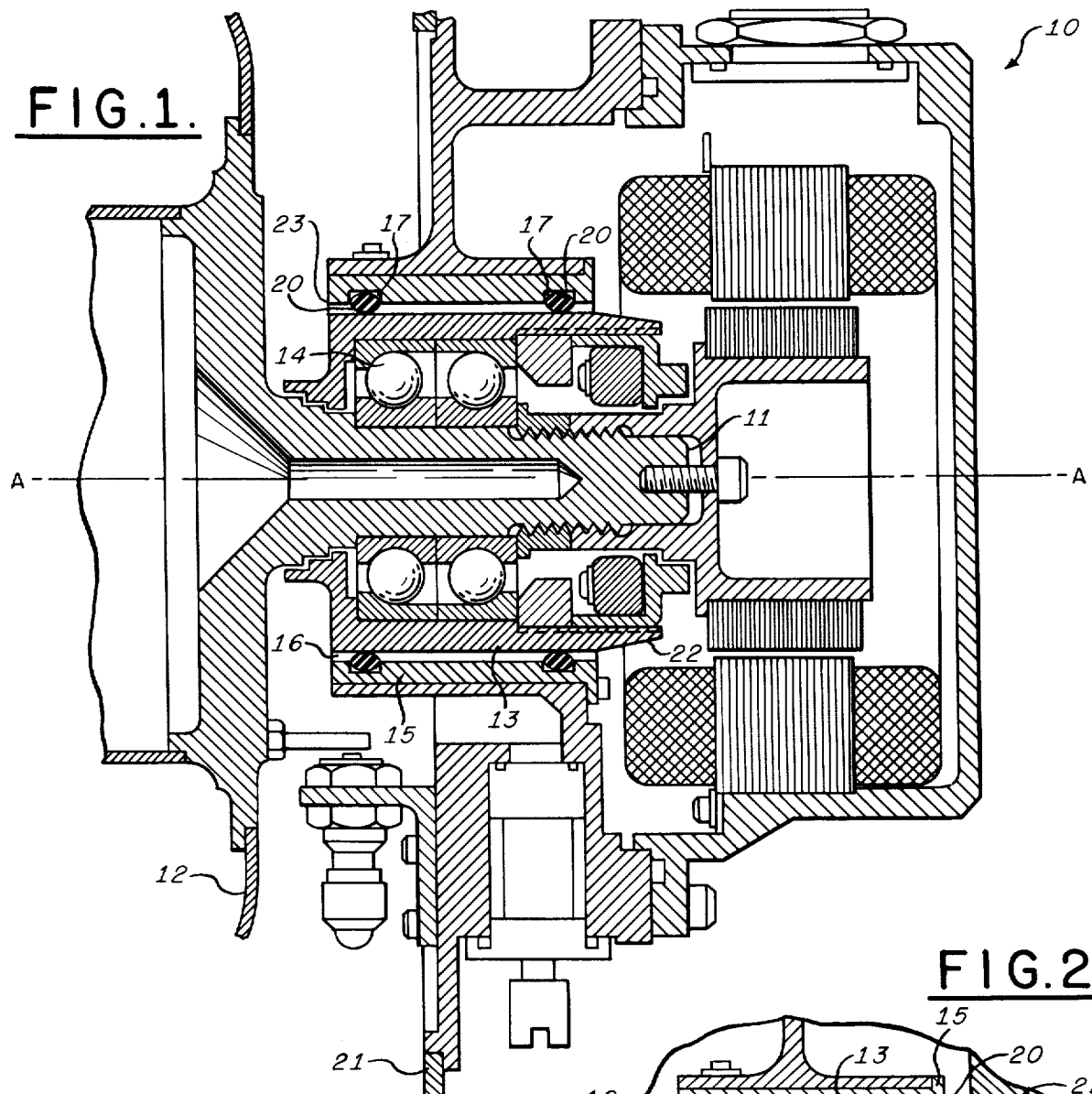
FIG. 1 is a sectional view of one of the supporting bearings of a gyroscope rotor incorporating the teachings of the present invention.

The bearing disclosed herein will be described with reference to a typical gyroscopic application. FIG. 1 shows a floating bearing assembly 10 which may be used in a space vehicle stabilization control moment gyroscope of the type described in U.S. Pat. No. 3,742,769 entitled "Gyroscope" issued July 3, 1973 in the names of the applicants of the subject application and assigned to the same assignee as the subject application although it will be understood that the present invention may be used in other applications where similar problems must be overcome. The bearing assembly 10 includes a rotatable member or shaft 11 coupled to a rotor shell 12 and rotatable about spin axis A—A with respect to a rotor housing 21 by means of an axially floating bearing cartridge 13. The bearing cartridge 13 includes a pair of duplex bearings 14 having inner and outer bearing races and a common outer sleeve assembly serving to clamp said duplex bearing outer races under a predetermined preload. The outer surface of the bearing cartridge 13 is permitted to translate along the longitudinal axis A—A of the rotatable member 11 under changes in ambient operating temperature or pressure differential, hence the term "floating bearing." A housing member 15 constituting a part of rotor bearing housing 21 includes a clearance bore 16 therethrough which accommodates the floating bearing cartridge 13.

Figure 3:
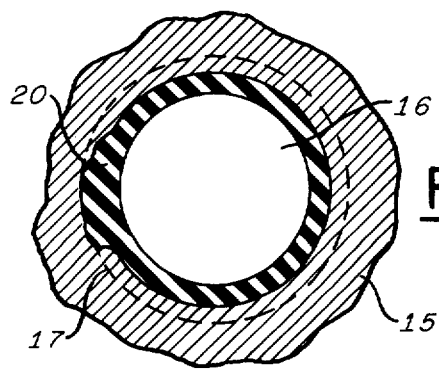
FIG. 3 is a partial sectional view of a housing member including a groove with an O-ring disposed therein.

As shown in the sectional view of FIG. 1, the housing 15 includes a pair of perimetrical grooves 17 which have a pair of standard resilient O-rings 20, well known in industry, disposed therein. FIG. 3 shows a partial sectional view of one of the O-rings 20 positioned in one of the perimetrical grooves 17 in the housing 15. The housing 15 is coupled through connecting structure to the rotor case 21 for the gyro rotor 12, which, in a control moment gyro application, may in turn be supported in a gimbal assembly (not shown) or in some reaction wheel applications may simply be secured to the vehicle.

The floating bearing cartridge 13 has an elongated bevelled edge 22 which allows the floating bearing cartridge to roll over the O-rings 20 upon assembly thereof into the clearance hole 16, thereby compressing the O-rings within the grooves 17 to an extent determined by the depth thereof. The bevelled edge 22 in place of a sharp corner on the cartridge 13 allows a progressive compression of the O-ring and avoids any tendency to shear off the part of the O-rings 20 which extend above the top of the grooves 17 when the cartridge 13 is slid into the bore 16.

Figure 4:
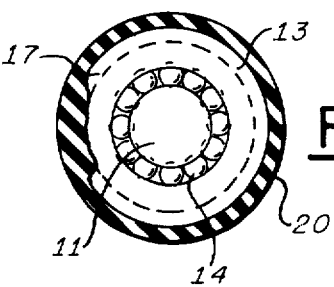
FIG. 4 is a partial sectional view of a bearing cartridge including a groove with an O-ring disposed therein.

Alternatively, the perimetrical grooves 17 could be formed in the surface of the floating bearing cartridge 13 and the pair of O-rings 20 disposed therein as shown in FIG. 4. The sharp corner 23 on the housing 15 would then have to be bevelled to avoid the possibility of shearing off part of the O-rings 20 when inserting the cartridge 13 into the clearance hole 16.

Without the O-rings 20 of the present invention, the floating bearing cartridge 13 could slide against the inner surface of the housing bore hole 16 in metal-to-metal contact. Since the housing bore 16 is a clearance hole, tight dimensional tolerance control is required during the boring process to provide minimal clearance between the cartridge 13 and the housing 15 and yet permit relative axial movement therebetween under temperature extremes. Since there must be a clearance fit over the temperature range which may typically be on the order of one-thousandth of an inch or less, the cartridge 13 can wobble within the bore 16 during the vibrations experienced by the gyroscope, especially during launching operations. To minimize galling of the mating surfaces under such conditions, the surface of the hole 16 may be plated with silver, gold, titanium or other metals having desirable anti-galling characteristics in order to prevent the bearing cartridge from seizing during launch which would of course render the bearing preload temperature compensation useless. Plating the surface of the hole 16 also contributes to extending the life of the gyro.

As mentioned above, the translational motion of the floating bearing cartridge 13 results from changes in the strains within the gyroscopic apparatus along the longitudinal axis A—A produced by temperature and pressure gradients acting on the rotor shell 12. A duplex bearing (not shown) at the opposite end of the gyroscopic device is fixed or clamped so that the axial motion along the A—A axis is restrained at this opposite end. Therefore, the bearing assembly 10 serves to compensate for all the changes in the axial dimension of the rotor shaft 11 while the O-rings 20 eliminate the metal-to-metal surface contact between the floating bearing cartridge 13 and the housing 15 thereby obviating the need for plating the surfaces of the hole 16 and cartridge 13.

In operation, the cartridge 13 translates to the right or left in response to the changes in dimension along the axis A—A. As the cartridge 13 moves relative to the O-rings 20, the rings tend to roll about their respective annular axes within the grooves 17 thereby providing minimal frictional resistance between the O-rings 20 and the cartridge 13. This action is analogous to that produced by rolling a cylindrical object, such as a section of hose, on a flat surface with the palm of a hand. It is important to note that the O-rings 20 are not stationary within their grooves 17 because if they were the frictional resistance of the floating bearing as it slides over the fixed O-rings 20 may be far greater than the frictional resistance between the cartridge 13 and the O-rings 20 as the rings rotate within their respective grooves 17. Since the O-rings 20 are compressed within the grooves 17 by the insertion of the cartridge 13, it can be readily appreciated that the O-rings 20 provide a zero-clearance fit between the housing 15 and the floating bearing cartridge 13.

In another embodiment of the present invention, the grooves 17, instead of being concentric with the clearance bore 16, may be eccentric therewith whereby the grooves 17 are deep on one side and shallow on the diametrically opposite side. With the O-ring in place, this arrangement functions to radially preload the bearing cartridge against the bore wall and thereby positively establish a fixed H vector location for the gyro rotor. The same effect may be produced by forming the grooves wider than the cross-section of the O-ring on one side of the bore 16 thereby allowing the O-ring to flatten out under the compression of the O-ring on the diametrically opposite side of the bore.

In a gyroscopic device it is desirable that the spin vector of the gyro rotor as shown in the referenced application have substantially infinite stiffness with respect to the vehicle on which the device is mounted. If the cartridge 13 is allowed to wobble or be radially displaced within the clearance hole 16, the spin vector will likewise be displaced and therefore will detract from the performance of the gyro in stabilizing the vehicle. Any compliance may result in a non-linearity in the over-all vehicle dynamic control system. Further, if this compliance is "too soft," it will prohibit a high gain control loop and lower the performance of the over-all system. The addition of the O-rings 20 between the housing 15 and the cartridge 13 provides a zero-clearance fit which greatly increases the stiffness of the spin vector with respect to the vehicle and therefore increases the performance capability of the gyroscopic device.

Figure 2:
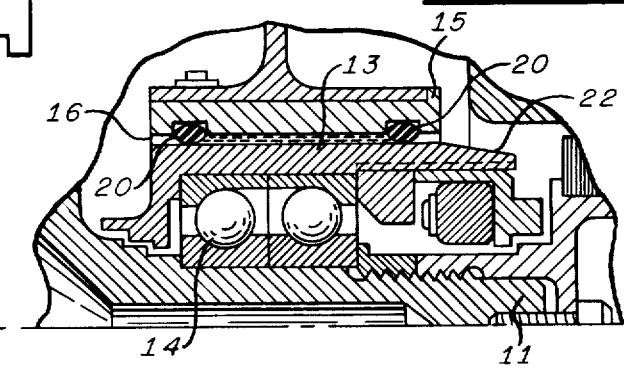
FIG. 2 is a similar partial sectional view of a modification of the present invention.

According to a modification of the present invention, improved operation of the gyroscope under a high vibratory environment is achieved by the addition of a fluid in the clearance gap between the bearing cartridge and the housing bore and contained by the spaced O-rings. This arrangement is shown in FIG. 2. In this modification, the gap tolerance is relaxed whereby to form a small intentional clearance, which may typically be on the order of thirty to forty-thousandths of an inch, between the outer surface of bearing cartridge 13 and the inner surface of bore 16 in housing 15 and a quantity of incompressible viscous fluid is inserted in the gap and retained therein by the spaced O-rings 20. In this construction additional radial damping under high vibratory environment is achieved by squeeze film action and metal-to-metal contact with its attendant galling cannot occur.

In the foregoing, we have illustrated and described a preferred embodiment of the present invention wherein the rotor shaft or journal is supported in duplex ball bearings. However, it will be understood that the invention may be used in connection with other forms of anti-friction bearings, such as, for example, roller bearings or single ball bearings.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. A bearing support for a rotating shaft subject to translation along its axis of rotation comprising housing means having a clearance bore therein, bearing means disposed within said bore and adapted to support said shaft therein for rotation about said axis, said shaft and bearing means being subject to translational motion along said axis with respect to said housing means, and at least one annular shaped O-ring resilient means being annularly and radially resilient disposed within a perimetrical groove formed in the surface of said clearance bore between said housing means and said bearing means for maintaining said shaft substantially aligned along said axis with respect to said housing means, said annular shaped resilient means being free to rotate about its circumferential axis in said clearance bore in response to translational motion of said shaft thereby accommodating translational and radial motion between said shaft and said housing means along said axis with only minimal frictional resistance.

2. A bearing support as recited in claim 1 in which said perimetrical groove formed in the surface of said clearance bore includes a groove having a depth at least in part less than the diameter of the annulus of said O-ring.

3. A bearing support as recited in claim 1 in which said resilient means includes a pair of O-rings disposed within perimetrical grooves formed in the surface of said clearance bore, the depth of said grooves being at least in part less than the diameter of the annulus of said O-ring.

4. A bearing support as recited in claim 3 wherein the relative radial dimensions of said bore and bearing means are such as to form a gap therebetween and an incompressible viscous fluid is disposed within said gap and contained by said O-rings.

5. A bearing as recited in claim 1 in which said resilient means includes at least one O-ring disposed within a perimetrical groove formed in the surface of said bearing means.

6. A bearing arrangment for supporting at least one journal of a rotor element in a housing member for rotation about an axis, the combination comprising a bore within said housing member, a ball bearing means for supporting said journal within said bore and including at least one pair of ball bearings in a bearing cartridge therefor adapted to provide a predetermined bearing preload regardless of axial translation of said journal, said cartridge adapted to fit within said housing bore with a radial clearance sufficient to provide translational movement of said journal relative to said bore over an operating temperature range, and at least one annular shaped o-ring resilient means being annularly and radially resilient, disposed within a perimetrical groove formed in the surface of said bore for maintaining said journal axis substantially radially fixed relative to said housing member bore, said annular shaped resilient means being free to rotate about its circumferential axis in said clearance bore in response to translational motion of said cartridge thereby permitting said axial translation of said cartridge over said temperature range with minimal frictional resistance.

7. A bearing as recited in claim 6 in which said resilient means includes an O-ring disposed in a first groove adjacent one end of said bearing cartridge and a further O-ring disposed in a second groove adjacent the other end or said bearing cartridge.

8. A bearing as recited in claim 7 in which the radial dimensions of said O-rings of said bore and bearing cartridge are such as to form a gap therebetween and a viscous fluid disposed within said gap between said O-rings for damping any radial motion between said bearing cartridge and housing.

9. A bearing arrangement as set forth in claim 7 wherein said grooves are eccentric with respect to the axis of said bore, the degree of eccentricity being such that said O-rings resiliently but positively restrain, under normal operation, said bearing cartridge against one wall of said housing bore whereby to positively fix said journal axis relative to said housing member while simultaneously permitting said axial translation over said temperature range.

* * * * *